United States Patent [19]
Forslund

[11] Patent Number: 5,568,787
[45] Date of Patent: Oct. 29, 1996

[54] LINE TYPE INDICATOR FOR FISHING REEL

[75] Inventor: Robert L. Forslund, Catoosa, Okla.

[73] Assignee: Zebco Division of Brunswick Corporation, Tulsa, Okla.

[21] Appl. No.: 558,387

[22] Filed: Nov. 16, 1995

Related U.S. Application Data

[63] Continuation of Ser. No. 294,625, Aug. 23, 1994, abandoned.

[51] Int. Cl.[6] .............................. G09F 9/40; A01K 89/00
[52] U.S. Cl. ..................... 116/307; 116/312; 116/315; 242/323; 242/912
[58] Field of Search ........................ 116/307, 309, 116/310, 311, 312, 313, 314, 315, 316, 317, 318, 319, 320; 242/223, 305, 310, 323, 912, 222

[56] References Cited

U.S. PATENT DOCUMENTS

| 2,596,374 | 5/1952 | Crapster | 116/318 X |
| 4,203,565 | 5/1980 | Puryear | 242/318 |
| 4,501,370 | 2/1985 | Kelley | 116/308 X |
| 4,762,290 | 8/1988 | Emura et al. | 242/223 X |
| 5,292,087 | 3/1994 | Sato | 242/310 X |

*Primary Examiner*—Thomas B. Will
*Assistant Examiner*—Willie Morris Worth
*Attorney, Agent, or Firm*—Wood, Phillips, VanSanten, Clark & Mortimer

[57] ABSTRACT

An apparatus for indicating line type on a fishing reel having a spool for storing a supply of fishing line and structure for wrapping the fishing line onto the spool to effect retrieval of paid out fishing line. The apparatus includes a rotatable dial or other settable structure on the fishing reel for giving a user a visual indication of which of a plurality of different types of fishing line is on the spool.

16 Claims, 2 Drawing Sheets

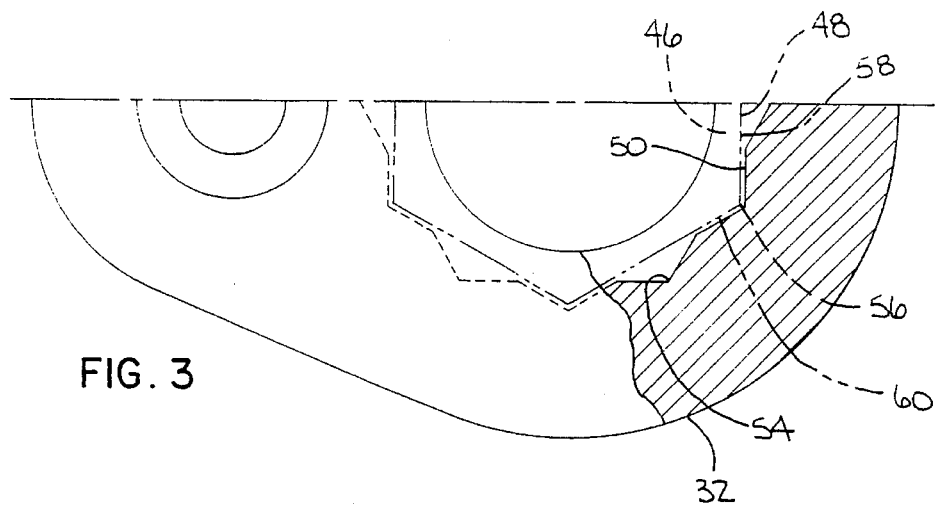
FIG. 3
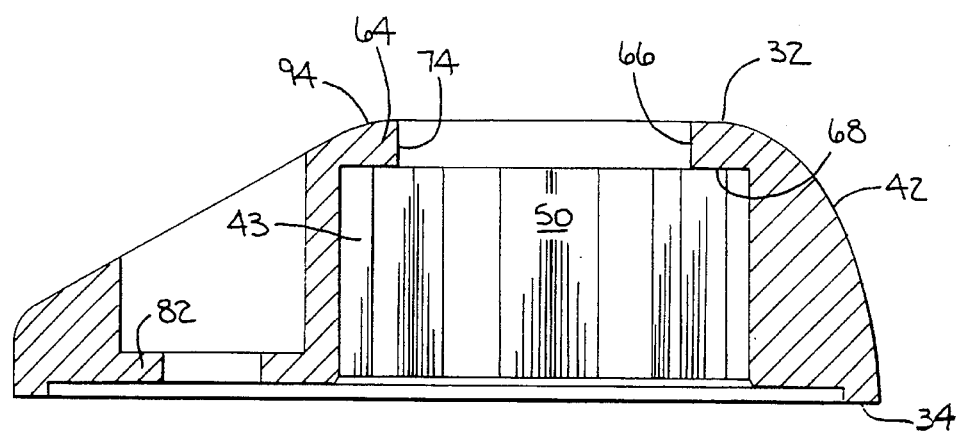
FIG. 4
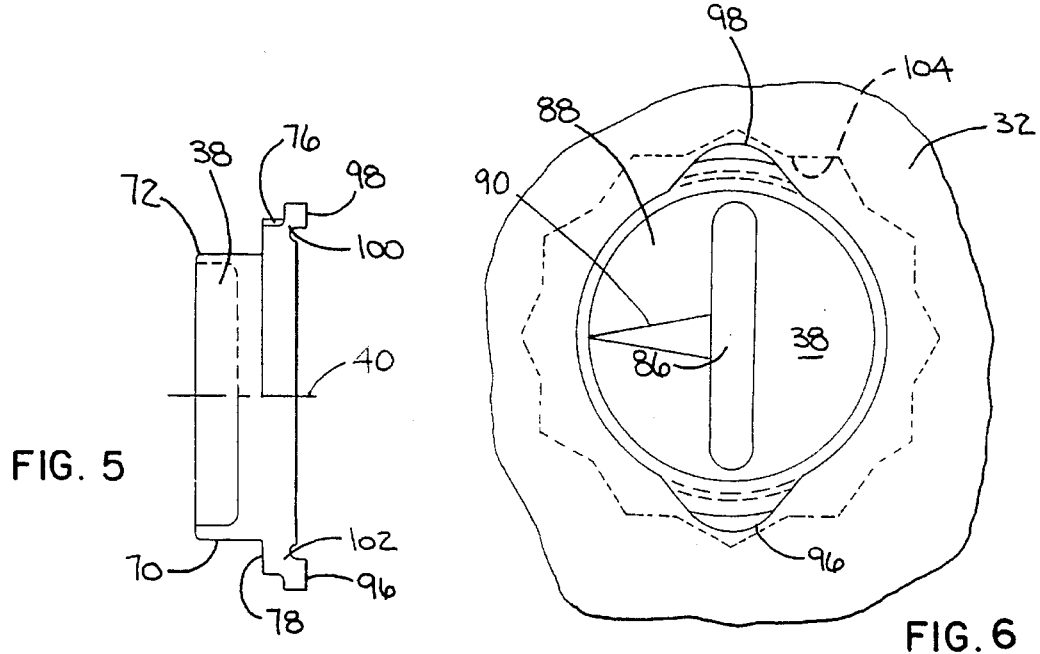
FIG. 5
FIG. 6

LINE TYPE INDICATOR FOR FISHING REEL

This application is a continuation of application Ser. No. 08/294,625, filed Aug. 23, 1994 now abandoned.

BACKGROUND OF THE INVENTION

1. Field of the Invention

This invention relates to fishing reels and, more particularly, to a settable structure that can be attached to a fishing reel to give the user thereof a visual indication of the type/weight of line on the fishing reel.

2. Background Art

It is common for fishermen to use different weight line on a given fishing reel. The industry commonly identifies the different weight lines by a weight "test" number.

While it is desirable to be aware of the weight of fishing line on a fishing reel, it is not always possible to visually examine the line and determine its weight. An inexperienced use may not even be able to discern lines of substantially different weights. Even an experienced user may not be able to ascertain the difference between, for example, eight and ten pound test line.

In many cases, the user will simply guess at the line weight. If it is important to the user to know the precise weight of the line, he/she has the option of either performing a test on the line or replacing the line with line of a known weight.

SUMMARY OF THE INVENTION

The present invention is directed to overcoming the above problem in a novel and simple manner.

In one form of the invention, an improvement is provided in a fishing reel of the type having a spool for storing a supply of fishing line and structure for wrapping the fishing line onto the spool to effect retrieval of paid out fishing line. The improvement is settable structure on the fishing reel for giving a user a visual indication of which of a plurality of different types of fishing line is on the spool.

With the inventive structure, a user can put one of a) a supply of a first type of fishing line and b) a supply of a second type of fishing line onto the spool and adjust the settable structure to give a visual indication to the user of the one of the first and second type of fishing line that is on the spool. This obviates the need to have a user physically inspect the line to identify its type/weight.

The settable structure may include a rotatable or translatable dial.

The dial may have an elongate rib that is graspable between the fingers of the user to facilitate rotation thereof.

In one form, the structure for wrapping line onto the spool includes a crank handle mounted onto a rotatable shaft having a tree end. The settable structure includes structure for attaching the rotatable dial to the crank handle at the free end of the rotatable shaft.

The structure for attaching the rotatable dial may include a body with a receptacle for the free end of the rotatable shaft.

A fastener may be provided on the free end of the rotatable shaft, with the receptacle bounded by a surface that is keyed to the fastener to limit relative rotation between the body and fastener about the rotational axis of the shaft.

Cooperating structure can be provided on the dial and receptacle surface to consistently and releasably maintain the dial in a plurality of different positions relative to the body.

The dial and a portion of the fishing reel can have alignable indicia to identify different types of fishing line depending upon the position of the dial. For example, the alignable indicia may include an indicating mark on one of the dial and fishing reel portion and a plurality of additional marks, each indicative of a different types of fishing line, on the other of the dial and fishing reel portion. The plurality of marks on the other of the dial and fishing reel may be numbers indicative of the test strength of line.

In another form of the invention, an apparatus is provided for giving the user of a fishing reel a visual indication of the type of fishing line on a spool on the fishing reel. The apparatus has a first member; structure for mounting the first member to a portion of fishing reel for guided movement relative to a portion of fishing reel; an indicating mark on one of a) the first member, b) the mounting structure, and c) a portion of a fishing reel to which the apparatus is attached; and a plurality of additional marks on one of a) the first member, b) the mounting structure, and c) a portion of a fishing reel to which the apparatus is attached, each indicative of a different type of fishing line on a fishing reel to which the apparatus is mounted.

With the above structure, the first member can be moved between first and second positions and with the first member in its first position, the indicating mark aligns with one of the additional marks which is indicative of a first type of fishing line. With the first member in the second position, the indicating mark aligns with another of the additional marks which is indicative of a second type of fishing line.

In one form, the structure for mounting the first member includes a body with structure cooperating between the body and a portion of a fishing reel for captively holding the first member against a portion of a fishing reel.

The structure for mounting the first member may include a body with means cooperating between the first member and the body for consistently and releasably maintaining the first member in a plurality of different positions relative to the body. The structure cooperating between the first member and the body may include a deflectable leg on one of the first member and body and a plurality of seats into which the leg is biased with the first member in different positions relative to the body.

The invention further contemplates the above structure in combination with a fishing reel to which the apparatus is attached.

BRIEF DESCRIPTION OF THE DRAWINGS

FIG. 3 is an enlarged, side elevation view of a body on the inventive apparatus and bisected along the length thereof;

FIG. 4 is a cross-sectional view of the body in FIG. 3 taken along line 4—4 of FIG. 1;

FIG. 5 is an enlarged, end elevation view of an indicating dial that is guidingly moved relative to the body in FIGS. 3 and 4; and FIG. 6 is an enlarged, fragmentary, side elevation view of the body in FIGS. 3 and 4 with the dial in FIG. 5 operatively connected thereto.

DETAILED DESCRIPTION OF THE DRAWINGS

Figure 1:
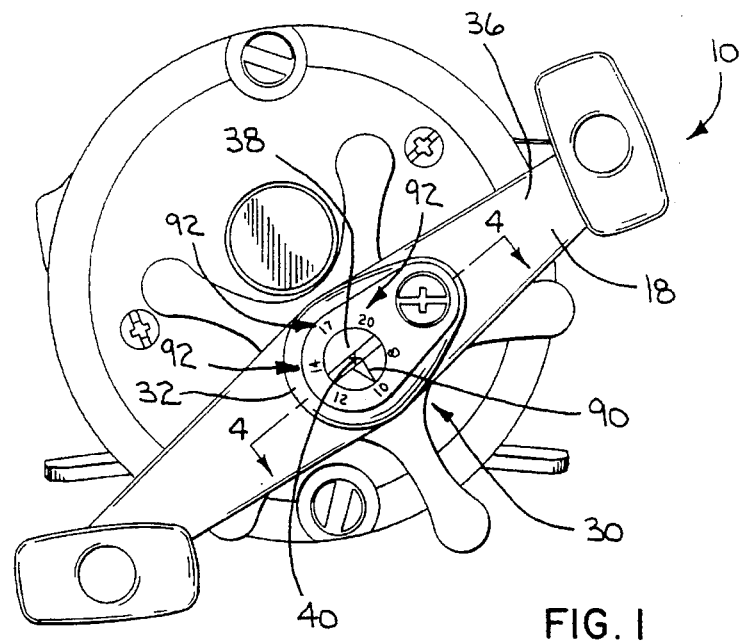
FIG. 1 is a side elevation view of a fishing reel with a settable apparatus, according to the present invention, for giving the user a visual indication of the type of fishing line on the reel.
Figure 2:
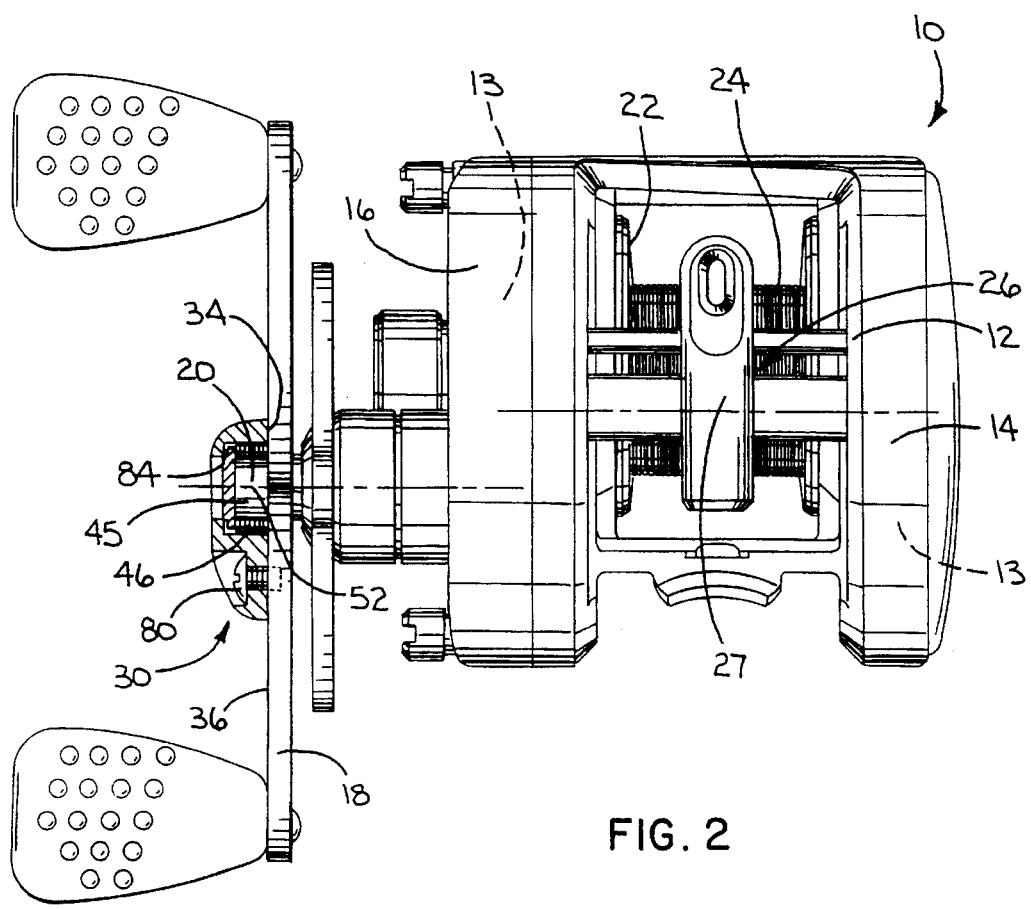
FIG. 2 is a front elevation view of the fishing reel in FIG. 1 showing the inventive apparatus in cross-section.

In FIGS. 1 and 2, a bait cast fishing reel is show at 10. The fishing reel 10 is just one type of fishing reel into which the present invention can be incorporated. For example, the invention can be incorporated in the same fashion into a spin cast fishing reel, a spinning fishing reel, a fly fishing reel, etc.

Briefly, the fishing reel 10 has a frame 12 defining a support for the reel operating mechanism 13, which is partially encased by laterally spaced end covers 14,16. A crank handle 18 drives a laterally extending shaft 20 which, through a portion of the operating mechanism 13 on one side of the reel 10, effects rotation of a laterally extending, line carrying spool 22. As the spool 22 rotates, line 24 is wrapped therearound to effect retrieval. At the same time, the mechanism 13 causes operation of a level wind system 26 which has a part 27, through which the line 24 extends, which reciprocates to cause an even distribution of line across the lateral extent of the spool 22.

The reel 10 is operable effectively using line 24 having a wide range of weight. The inventive apparatus, shown on the fishing reel 10 at 30 in FIGS. 1 and 2, and in detail in FIGS. 3–6, gives the user a visual indication of the weight of line 24 that is on the spool 22.

The apparatus 30 has an egg-shaped body 32 with a flat rim 34 to facially abut a laterally outwardly facing surface 36 on the crank handle 18. The body 32 is designed to maintain a movable member/dial 38 on the reel 10 to be rotatable guidingly about a laterally extending axis 40 relative to the body 32 and the crank handle 18.

The body 32 has a radially enlarged portion 42 defining a receptacle 43 for the free end 45 of the shaft 20 and a fastener/nut 46 that threadably engages the shaft 20 and captively maintains the crank handle 18 in an operative position on the shaft 20.

Typically, the nut 46 has an hexagonal outer surface 48 that is accommodated by a flatted, inside surface 50 that bounds the receptacle 43 and makes keyed connection with the outside surface 48 of the nut 46. This keys the nut 46 against rotation relative to the body 32 about the rotational axis 52 of the shaft 20.

Preferably, the surface 50 has a star-shaped configuration at right angles to the axis 52 such that twelve different seats 54 are defined to each receive a corner 56 defined between adjacent, flat portions 58, 60 of the hexagonal surface 48 on the nut 46. This arrangement allows all of the corners 56 to be alignable with the seats 54 through rotation of the nut 46 by no more than 30°.

The body 32 has an outer wall 64 with a bore 66 communicating therethrough to the receptacle 44. The bore 66 has a diameter that is smaller than the diameter of the receptacle 44 so that an inwardly facing, annular shoulder 68 is defined by the wall 64.

The dial 38 has a disk shape with a stepped outer wall 70. The wall 70 is defined by a first diameter portion 72, which is closely received in the bore 66 and guided in rotation by the wall surface 74 bounding the bore 66. A second diameter portion 76 has a larger diameter than the first portion 72 and defines an annular shoulder 78 therebetween which is abuttable to the shoulder 68 on the wall 64 to limit lateral movement of the dial 38.

With the dial 38 in the receptacle 44, the body 32 can be placed over the shaft 20 with the nut 46 thereon. With the rim 34 abutted facially to the crank handle surface 36, a screw 80 is directed through an undercut wall 82 on the body 32 and captively holds the wall 82 against the crank shaft 18. This secures the body 32 in its operative position.

In the operative position for the body 32, the dial 38 is captively held between the annular shoulder 68 and the free end 84 of the nut 46 at the free end 45 of the shaft 20. The dial 38 and body 32 are configured so that in this captive state, the dial 38 can be rotated by the user around the axis 40.

Rotation of the dial 38 is facilitated by the provision of an elongate rib 86 on the outer surface 88 thereof. The rib 86 is accessible through the bore 66 and can be grasped between the user's two fingers to facilitate rotation thereof about the axis 40.

The dial 38 has an indicating mark/arrow 90 thereon. A plurality of indicia 92 are disposed on the outer surface 94 of the wall 64 around the periphery of the bore 66. The indicia 92 each preferably identify a different weight line. For example, in the reel 10 depicted, the indicating arrow can be aligned with indicia 92 incrementally indicating 8–20 pound test line.

To maintain the dial 38 releasably in a plurality of different rotational positions, the dial 38 is provided with diametrically opposite and radially projecting, deflectable legs 96,98. The legs 96,98 may be formed as one piece with the dial 38 from a plastic material. The legs 96,98 are connected to the remainder of the dial 38 through hinge portions 100,102, which have a reduced cross-sectional area to allow the legs 96,98 to flex thereat radially inwardly towards the axis 40.

The legs 96,98 are configured to be biasably pressed into each seat 54. By exerting a predetermined torque on the dial 38, the legs 96,98 are caused to ride upwardly on ramp surfaces 104 defined between adjacent seats 54. This radially deflects the legs 96,98 inwardly towards each other to allow clearance of the surfaces 104. Continued rotation of the dial 38 causes the legs 96,98 to align with adjacent seats 54, at which point the legs 96,98 spring back to releasably hold the dial 38 in that position. The legs 96,98 are constructed to securely hold the dial 38 in a desired position while allowing the dial 38 to be rotated out of that position under a predetermined torque which can be conveniently applied through the rib 86.

With the inventive structure, after a user puts a supply of fishing line in the reel 10, he/she can grasp the dial 38 and align the arrow 90 with the indicia 92 indicative of the weight of the line. This dial setting will be maintained. The user can view the dial 38 to identify the type of line on the reel, obviating the need to visually inspect the line to identify its weight.

The location of the inventive apparatus is such that it does not interfere with the reel operation. It is sufficiently lightweight that it does not add appreciably to the weight of the reel 10. By reason of the rounded configuration of the outer surface 94 of the body 32, there is no tendency for objects to hang up on the body 32. At the same time, the apparatus 30 is readily accessible and visible from the side of the reel 10.

The foregoing disclosure of specific embodiments is intended to be illustrative of the broad concepts comprehended by the invention.

I claim:

1. In a fishing reel having a spool for storing a supply of fishing line, and means for wrapping the fishing line onto the spool to effect retrieval of paid out fishing line including a crank handle that is operable to drive a rotatable shaft, the improvement comprising:

settable means on the fishing reel for giving a user a visual indication of which of a plurality of different types of fishing line is on the spool, whereby a user can put one of (a) a supply of a first type of fishing line and (b) a supply of a second type of fishing line onto the spool and adjust the settable means to give a visual indication to the user of which one of the first and second types of fishing line is on the spool, thereby obviating the need to have a user physically inspect the line to identify its type, wherein the settable means includes a dial, and means for attaching the dial to the crank handle.

2. The improved fishing reel according to claim 1, wherein the rotatable shaft has a free end and the means for attaching the dial includes a body having a receptacle for the free end of the rotatable shaft.

3. The improved fishing reel according to claim 2, including means for securing the body to the crank handle to maintain the free end of the rotatable shaft in the body receptacle.

4. The improved fishing reel according to claim 2, wherein there is a fastener on the free end of the rotatable shaft and the receptacle is bounded by a surface that is keyed to the fastener to limit relative rotation between the body and the fastener about the rotational axis of the shaft.

5. The improved fishing reel according to claim 4, wherein there are means on the dial cooperating with the receptacle surface to consistently and releasably maintain the dial in a plurality of different rotational positions relative to the body.

6. An apparatus for giving the user of a fishing reel a visual indication of a type of fishing line on a spool on fishing reel, the apparatus comprising:

a first member;

means for mounting the first member to a portion of the fishing reel for guided movement relative to the portion of the fishing reel to which the first member is mounted selectively between first and second positions;

means to facilitate movement of the first member between the first and second positions by the user;

an indicating mark on one of (a) the first member and (b) the mounting means; and a plurality of additional marks on one of (a) the first member and (b) the mounting means, each indicative of a type of fishing line on the fishing reel to which the apparatus is mounted, whereby with the first member in the first position the indicating mark aligns with one of the additional marks which is indicative of a first type of fishing line, and with the first member in the second position the indicating mark aligns with another of the additional marks which is indicative of a second type of fishing line, whereby a user can put one of (a) a supply of the first type of line and (b) a supply of the second type of line on the fishing reel and move the first member to one of the first and second positions to give a visual indication to the user of which of the first and second type of fishing lines is on the reel, thereby obviating the need to have a user physically inspect a line to identify its type, wherein the means for mounting the first member includes a body and means cooperating between the body and the portion of the fishing reel for captively holding the first member against the portion of the fishing reel.

7. The apparatus according to claim 6, in combination with a fishing reel to which the apparatus is attached.

8. The combination according to claim 7, wherein the body has a receptacle bounded by a surface to make keyed connection with the portion of the fishing reel.

9. The combination according to claim 7, further comprising means cooperating between the first member and the body for consistently and releasably maintaining the first member in a plurality of different positions relative to the body.

10. The combination according to claim 9, wherein the means cooperating between the first member and the body includes a deflectable leg on one of (a) the first member and (b) the body and a plurality of seats into which the leg is biased with the first member in different positions relative to the body.

11. An apparatus for giving the user of a fishing reel a visual indication of the type of fishing line on a spool on the fishing reel, wherein said fishing reel includes a crank handle mounted onto a rotatable shaft having a free end, the apparatus comprising:

a generally elongate body defining a receptacle for making keyed connection with a fastener at the free end of the shaft, said elongate body including an outer wall integral with said elongate body with there being a first bore communicating therethrough to said receptacle, said bore having a smaller diameter than a diameter of the receptacle;

a rotatable dial for indicating the type of line on the spool, said rotatable dial having a first diameter portion which is closely received in said first bore and a second diameter portion, larger than the first diameter portion, which is received in said receptacle;

means for mounting said elongate body to said crank handle;

means on said rotatable dial to facilitate movement of the rotatable dial between first and second positions by the user;

an indicating mark on one of a) the rotatable dial and b) the elongate body; and a plurality of additional marks on the other of a) the rotatable dial and b) the elongate body, each indicative of the type of fishing line on the fishing reel to which the apparatus is mounted, whereby with the rotatable dial in the first position the indicating mark aligns with one of the additional marks indicative of a first type of fishing line, and with the rotatable dial in the second position the indicating mark aligns with another of the additional marks indicative of a second type of fishing line.

12. The apparatus of claim 11, further comprising means cooperating between the rotatable dial and the elongated body for consistently and releasably maintaining the rotatable dial in a plurality of different positions relative to the body.

13. The apparatus of claim 12, wherein the means cooperating between the rotatable dial and the body includes a deflectable leg on one of (a) the rotatable dial and (b) the body and a plurality of seats in the other of (a) the rotatable dial and (b) the body into which the leg is biased with the rotatable dial in different positions relative to the body.

14. The apparatus of claim 13, wherein the means to facilitate movement of the rotatable dial includes an elongate rib having a straight portion projecting axially with respect to the rotational axis of the dial.

15. The apparatus of claim 14, wherein said mounting means includes an anchor screw extending through a second bore defined by said elongated body and engaging a screw hole in said crank handle.

16. In a fishing reel having a spool for storing a supply of fishing line, and means for wrapping the fishing line onto the spool to effect retrieval of paid out fishing line including a crank handle that is operable to drive a rotatable shaft, the improvement comprising:

settable means on the fishing reel for giving a user a visual indication of which of a plurality of different types of fishing line is on the spool, whereby a user can put one of (a) a supply of a first type of fishing line and (b) a supply of a second type of fishing line onto the spool and adjust the settable means to give a visual indication to the user of which one of the first and second types of fishing line is on the spool, thereby obviating the need to have a user physically inspect the line to identify its type, wherein the settable means includes a dial, and means for attaching the dial to the rotatable shaft for rotation relative thereto.

\* \* \* \* \*